(12) United States Patent
Kumar et al.

(10) Patent No.: US 11,582,033 B2
(45) Date of Patent: *Feb. 14, 2023

(54) CRYPTOGRAPHIC MANAGEMENT OF LIFECYCLE STATES

(71) Applicant: Cryptography Research, Inc, San Jose, CA (US)

(72) Inventors: Ambuj Kumar, Sunnyvale, CA (US); Ronald Perez, Piedmont, CA (US)

(73) Assignee: Rambus Inc., San Jose, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/119,513

(22) Filed: Dec. 11, 2020

(65) Prior Publication Data

US 2021/0160063 A1    May 27, 2021

Related U.S. Application Data

(63) Continuation of application No. 15/755,274, filed as application No. PCT/US2016/066762 on Dec. 15, 2016, now Pat. No. 10,897,352.

(60) Provisional application No. 62/268,018, filed on Dec. 16, 2015.

(51) Int. Cl.
  *H04L 9/00* (2022.01)
  *H04L 9/08* (2006.01)
  *G09C 1/00* (2006.01)

(52) U.S. Cl.
  CPC .............. *H04L 9/0861* (2013.01); *G09C 1/00* (2013.01); *H04L 9/085* (2013.01); *H04L 9/0891* (2013.01)

(58) Field of Classification Search
  USPC .......................................................... 380/44
  See application file for complete search history.

(56) References Cited

U.S. PATENT DOCUMENTS

| 8,014,530 B2 | 9/2011 | Brickell et al. |
| 8,259,947 B2 | 9/2012 | Rose et al. |
| 8,315,620 B1 | 11/2012 | Williamson et al. |
| | (Continued) | |

FOREIGN PATENT DOCUMENTS

| CN | 1547836 A | 11/2004 |
| CN | 101140778 A | 3/2008 |
| CN | 102725737 A | 10/2012 |
| CN | 103548300 A | 1/2014 |
| CN | 105007157 A | 10/2015 |
| JP | 2009-003933 A | 1/2009 |

OTHER PUBLICATIONS

CN Office Action dated Apr. 25, 2021 re: CN Appln. No. 201680072688.1. 6 pages. (W/Translation).

(Continued)

*Primary Examiner* — Jeffrey C Pwu
*Assistant Examiner* — Samuel Ambaye
(74) *Attorney, Agent, or Firm* — The Neudeck Law Firm, LLC

(57) ABSTRACT

A secret key value that is inaccessible to software is scrambled according to registers consisting of one-time programmable (OTP) bits. A first OTP register is used to change the scrambling of the secret key value whenever a lifecycle event occurs. A second OTP register is used to undo the change in the scrambling of the secret key. A third OTP register is used to affect a permanent change to the scrambling of the secret key. The scrambled values of the secret key (whether changed or unchanged) are used as seeds to produce keys for cryptographic operations by a device.

20 Claims, 9 Drawing Sheets

(56) References Cited

U.S. PATENT DOCUMENTS

| 8,701,125 B2 | 4/2014 | Pillers |
| 2006/0176068 A1 | 8/2006 | Holtzman et al. |
| 2007/0157000 A1 | 7/2007 | Qawami et al. |
| 2009/0113114 A1 | 4/2009 | Berenbaum et al. |
| 2011/0110064 A1 | 5/2011 | Foster, Sr. et al. |
| 2011/0208975 A1 | 8/2011 | Sibert |
| 2014/0044265 A1 | 2/2014 | Kocher et al. |
| 2014/0136855 A1 | 5/2014 | Ducharme et al. |
| 2015/0006968 A1* | 1/2015 | ShanBhogue ....... G06F 11/0727 714/42 |
| 2015/0312036 A1 | 10/2015 | Kumar |
| 2015/0326540 A1* | 11/2015 | Hamburg ............ H04L 63/0428 713/168 |
| 2017/0124354 A1* | 5/2017 | Rohleder ................ G06F 21/70 |

OTHER PUBLICATIONS

India First Examination Report dated Mar. 9, 2021 re: India Appln. No. 201837009781. 7 pages (w/translation).
Extended European Search Report dated Jun. 17, 2019 re: EP Appln. No. 16876634.3. 6 Pages.
Notification of Transmittal of the International Search Report and the Written Opinion of the International Searching Authority dated Mar. 22, 2017 re: Int'l Appln. No. PCT/US16/066762. 12 Pages.
CN Office Action dated Sep. 30, 2020 re: CN Appln. No. 201680072688. 1. 10 pages. (W/Translation).
JP Office Action dated Oct. 28, 2020 re: JP Appln. No. 2018-517135. 4 pages.

\* cited by examiner

CRYPTOGRAPHIC MANAGEMENT OF LIFECYCLE STATES

DETAILED DESCRIPTION OF THE EMBODIMENTS

Many electronic devices (e.g., cell phones, tablets, set-top boxes, etc.) use secure cryptographic keys. These keys may be used, for example, to secure data on the device, secure communication, and/or to authenticate the device. As a device goes through various lifecycle events, it is desirable to protect the keys used by the device from disclosure (thereby protecting the data on the device, preventing unauthorized use, etc.)

For example, an end-user, after using a device for a while, and storing sensitive data therein, may experience a problem that requires the device be sent back to the manufacturer for repair. In this case, the end-user would not want the manufacturer or repair center to access the sensitive data stored on the device. However, the end-user would also like the data to be accessible to them when the device is returned.

In an embodiment, a secret key value that is inaccessible to software (e.g., hardwired into the device) is scrambled according to registers consisting of one-time programmable bits. These one-time programmable (OTP) bits are, by hardware design, only able to be changed from their initial value to another value once, and cannot be returned to the initial value (e.g., bits that reflect whether an on-chip fuse has been blown or is still intact).

A first one of the OTP registers is used to change the scrambling of the secret key value whenever a lifecycle event occurs (e.g., device is sent to a repair center.) By changing the scrambling of the secret key value, the keys used by the device are also changed—thereby preventing data, authorizations, or authentications previously used by the device from being copied or used (e.g., by the repair center employees.)

A second one of the OTP registers is used to undo the change in the scrambling of the secret key. Thus, the second OTP register can 'restore' the keys used by the device back to their pre-lifecycle event values—thereby restoring the ability to use the data, authorizations, and/or authentications used prior to the lifecycle event.

A third one of the OTP registers is used to affect a permanent change to the scrambling of the secret key—thereby permanently preventing the data, authorizations, or authentications from being accessed or used. The bits in this register may be used when, for example, a user sells a device and therefore does not want the new owner to read the previous owners data, or use the authorizations and authentications associated with the previous owner.

Figure 1:
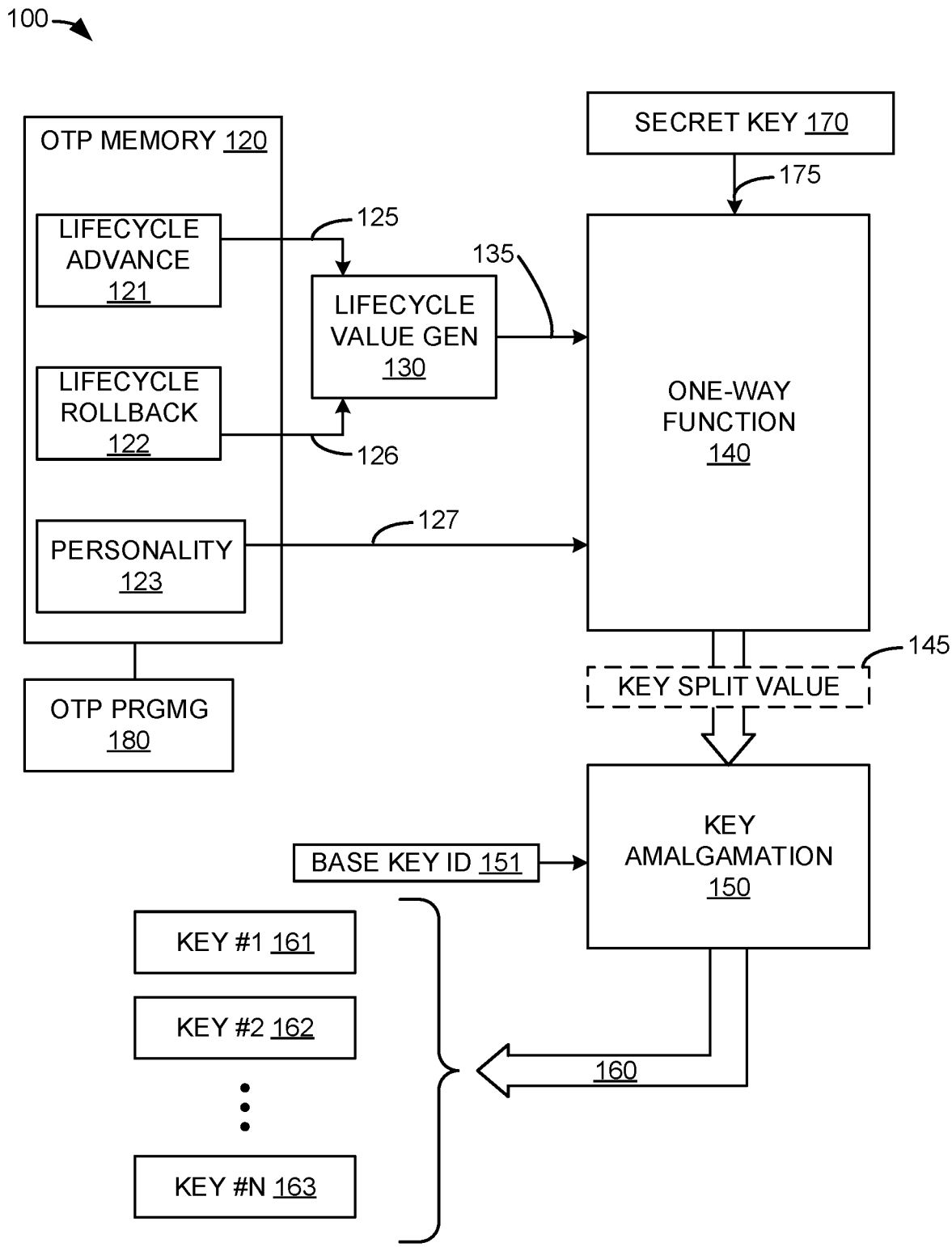
FIG. 1 is a block diagram illustrating a lifecycle management system.

FIG. 1 is a block diagram illustrating a lifecycle management system. In FIG. 1, system 100 comprises one-time programmable (OTP) memory 120, lifecycle value generator 130, one-way function 140, key amalgamation 150, secret key 170, and OTP programming circuit 180. OTP memory 120 includes lifecycle advance register 121, lifecycle rollback register 122, and personality register 123.

OTP memory 120 can be, for example, a one-time electrically programmable semiconductor memory (e.g., fabricated on a semiconductor substrate or using a semiconductor material). The bits stored by OTP memory 120 are, by hardware design, only able to be changed from their initial value to another value once. The bits stored by OTP memory 120, once electrically changed from an initial value, cannot be returned to their initial value. For example, the bits that comprise OTP memory 120 may be implemented as 'fused' bits. These fused bits, once changed (i.e., blown) undergo an irreversible physical process (e.g., the destruction of a conducting element) and therefore cannot be changed back to their initial state.

OTP programming circuit 180 is operatively coupled to OTP memory 120. OTP programming circuit 180 is operatively coupled to OTP memory 120 to program the bits in OTP memory 120 (e.g., blow fuses to change the values of lifecycle advance register 121, lifecycle rollback 122 register, personality register 123, etc.) OTP programming circuit 180 may be controlled to change bits in OTP memory 120 by a processor and/or software (not shown in FIG. 1) running on a device that includes system 100. This processor and/or software may change the bits in OTP memory 120 in response to a command by a user of the device.

Secret key 170 is operatively coupled to one-way function 140. Secret key 170 (a.k.a., device generated one-time programmable key split—DGOK) stores a secret key value 175 in hardware. Secret key 170 provides a secret key value 175 to one-way function 140. Secret key 170 may be, for example, embedded in the netlist of the device, an area of secured flash, or some other nonvolatile form/circuit. In an embodiment, secret key 170 stores a 256-bit secret key value 175.

Lifecycle advance register 121 is operatively coupled to lifecycle value generator 130. Lifecycle advance register 121 stores lifecycle advance value 125. OTP memory 120 provides lifecycle value generator 130 with the lifecycle advance value 125 stored by lifecycle advance register 121. Lifecycle rollback register 122 is operatively coupled to lifecycle value generator 130. Lifecycle rollback register 122 stores lifecycle rollback value 126. OTP memory 120 provides lifecycle value generator 130 with the lifecycle rollback value 126 stored by lifecycle rollback register 122.

Lifecycle value generator 130 receives lifecycle advance value 125 and lifecycle rollback value 126 from OTP memory 120. Lifecycle value generator 130 produces lifecycle state value 135. Lifecycle value generator 130 processes lifecycle advance value 125 and lifecycle rollback value 126 using a lifecycle state generating process/function. This lifecycle state generating process produces a lifecycle state value 135 from lifecycle advance value 125 and lifecycle rollback value 126. Lifecycle state value 135 is provided to one-way function 140.

Personality register 123 is operatively coupled to one-way function 140. Personality register 123 stores personality value 127. OTP memory 120 provides one-way function 140 with the personality value 127 stored by personality register 123. In some embodiments, a processor and/or software on a device with system 100 may be able to read the contents of one or more of lifecycle advance register 121, lifecycle rollback register 122, and personality register 123 from OTP memory 120, or otherwise obtain one or more of lifecycle advance value 125, lifecycle rollback value 126, or personality value 127.

One-way function 140 uses secret key value 175, lifecycle state value 135 and personality value 127 to generate key split value 145. One-way function 140 may produce key split value 145 by a process that includes, for example, using personality value 127 as a key tree path and secret key value 127 as an Advanced Encryption Standard (AES) key. Likewise, the process one-way function 140 uses to produce key split value 145 may include using lifecycle state value 135 as a key tree path and the result of the previous processing of personality value 127 and secret key value 175 as an AES key. Other one-way functions/processes may be used to generate key split value 145 from secret key value 175, lifecycle state value 135 and personality value 127. Thus, it should be understood that any difference (even a one bit difference) between a given lifecycle state value 135 or a given personality value 127 will result in a different key split value 145. In addition, if the one-way function process is selected appropriately, it should be economically infeasible to determine secret key value 175 from key split values 145—even when the lifecycle state value(s) 135, lifecycle advance value(s) 125, lifecycle rollback value(s) 126 and/or personality value(s) 127 are known.

Key split value 145 is provided to key amalgamation 150. Based on key split value 145, and a base key identification value 151, key amalgamation 150 produces encryption keys 160 for use by the device in cryptographic operations. Keys 160 are illustrated in FIG. 1 as including a plurality of keys. Specifically, in FIG. 1, keys 160 include key #1 161, key #2 162, and key #3 163. Keys 160 can include, for example, an Elliptic Curve Cryptography (ECC) key for signing (i.e., authenticating), an ECC private key for encryption/decryption; an AES-256 device specific key, and/or an AES-128 device specific key. Other keys for other uses can also be produced from key split value 145 by key amalgamation 150.

In an embodiment, a device with system 100 may go through various lifecycles. These lifecycles may necessitate a desire to protect and/or change keys 160. For example, the device may be subject to lab debug or silicon debug after secret key 170 has been provisioned with secret key value 175. This may occur, for example, after packaging, the device and/or IC holding system 100 comes back to the vendor for initial debug and triage. In another example, the device may be used in the field by a user and then sent back to the OEM, ODM, repair shop, or chip vendor for failure analysis. When that device's fault is fixed, the device can be shipped back to the end user. In this case, it is desirable for the device to provide the same functionality (and stored data) as was available prior to sending the device for repair. In another example, an end user may sell the device to another user. In this case, the first user would likely not want to reveal their keys (and therefore their data) to the second user.

In an embodiment, personality register 123 is configured with an initial value—for example a sixteen (16) bit zero value (i.e., 0x0000h.) During operation, the bits of personality register 123 may be successively changed by OTP programming 180 in the manner of a thermometer coded counter. This changing of bit values in personality register 123 by OTP programming 180 may be controlled by a privileged process (e.g., operating system) running on the device. Since the bits of OTP memory (and therefore personality register 123) can only be changed once, when all the bits of personality register 123 have been changed (e.g., set to '1' for a value of 0xFFFFh), attempts to further change the value of personality register 123 may result in an error being signaled.

In an example, a user of the device can cause the personality register 123 to be incremented (or otherwise change at least one bit in personality register 123) before giving up possession of the device (e.g., to a new owner). In another example, the ODM may increment (or otherwise change at least one bit in personality register 123) before sending the device to an OEM. This ensures that there are no secrets 'left behind' for the ODM to discover. In these examples, the user and/or ODM can read the contents of personality register 123 to ensure that system 100 will generate encryption keys 160 that are different from the encryption keys 160 generated prior to the change to the contents of personality register 123.

In an embodiment, lifecycle advance register 121 is configured with an initial value—for example a sixteen (16) bit zero value (i.e., 0x0000h.) Likewise, lifecycle rollback register 122 is configured with an initial value—for example a sixteen (16) bit zero value (i.e., 0x0000h.) During operation, the bits of lifecycle advance register 121 and the bits of lifecycle rollback register 122 may be successively, and independently, changed by OTP programming 180 in the manner of a thermometer coded counter.

The changing of the contents of lifecycle advance register 121 and the contents of lifecycle rollback register 122 by OTP programming 180 may be controlled by a privileged process (e.g., operating system) running on the device. The changing of individual bit values in lifecycle advance register 121 and the bits of lifecycle rollback register 122 by OTP programming 180 may be controlled by respective privileged processes running on the device. For example, for a 16-bit lifecycle advance register 121 and a 16-bit lifecycle rollback register 122, up to 16 privileged processes may be each only allowed to change the value of a single corresponding bit in lifecycle advance register 121 and/or lifecycle rollback register 122. In other words, for example, to change a particular bit in lifecycle advance register 121 or lifecycle rollback register 122, authorization would be required from a corresponding system authorization process (e.g., root process). Thus, the device, in this example, may have up to sixteen (16) of these 'root' authorization entities.

Lifecycle advance register 121 can be incremented (or otherwise have a one-time programmable bit changed) when there is a desire to give the device a temporary set of encryption keys 160. For example, when a user sends the device to an OEM for debug/diagnosis, the user can control the device to increment lifecycle advance register 121. Thus, the OEM will not receive, or be able to economically discover, the set of keys 160 that the device was using prior to incrementing lifecycle advance register 121. Rather, the OEM will be able to obtain the temporary keys 160 produced from the new lifecycle state value 135 (which results from the changed lifecycle advance value 125.)

When the OEM returns the device to the user, the user can recover the original keys 160 by incrementing (or changing the appropriate one-time programmable bit) in the lifecycle rollback register 122. Thus, incrementing lifecycle advance register 121 causes temporary keys 160 to be produced, and incrementing lifecycle rollback register 122 undoes the effect and causes the original keys 160 to be produced. Lifecycle value generator 130 is configured such that certain values stored in lifecycle rollback register 122 undo the effects of certain values stored in lifecycle advance register 121—for example equal values. Lifecycle value generator 130 may be configured such that other pairings may be selected whereby the selected lifecycle rollback value 126 undoes the effects of a corresponding lifecycle advance value 125.

In an embodiment, the changes to lifecycle advance register 121 can be compounded. For example, user #1 may increment lifecycle advance register 121 to use a first set of temporary keys 160, then user #2 may increment lifecycle advance register 121 to use a second set of temporary keys 160. User #2 (or user #1) may then increment lifecycle rollback register 122 to return to using the first set of temporary keys. Lifecycle rollback register 1 may be incremented again to return to using the original keys 160.

Since the bits of OTP memory (and therefore lifecycle advance register 121 and lifecycle rollback register 122) can only be changed once, when all the bits of lifecycle advance register 121 or lifecycle rollback register 122 have been changed (e.g., set to '1' for a value of 0xFFFFh), attempts to further change the values of either lifecycle advance register 121 and lifecycle rollback register 122 may result in an error being signaled.

Figure 2:
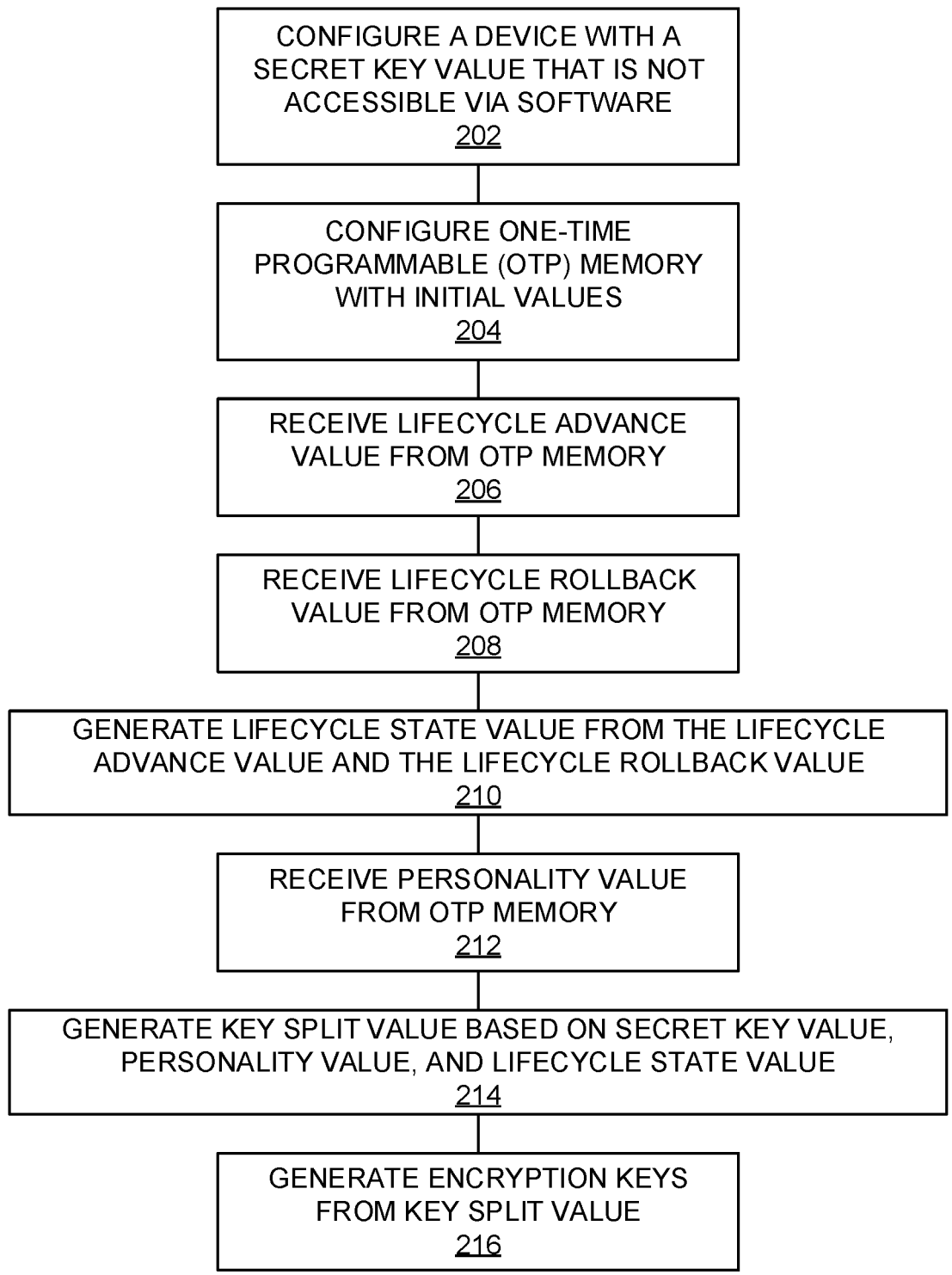
FIG. 2 is a flowchart illustrating a method of generating encryption keys that are lifecycle state dependent.

FIG. 2 is a flowchart illustrating a method of generating encryption keys that are lifecycle state dependent. The steps illustrated in FIG. 2 may be performed by one or more elements of system 100. A device is configured with a secret key that is not accessible via software (202). For example, system 100 can be configured with secret key 170 for providing secret key value 175 to one-way function 140. The device is configured such that secret key 170 (and therefore secret key value 175) cannot be read or written by software running on the device.

A one-time programmable (OTP) memory is configured with initial values (204). For example, OTP memory 120 (and therefore lifecycle advance register 121, lifecycle rollback register 122, and personality register 123, in particular) may be configured with initial values that can be changed only once. For example, when OTP memory 120 is comprised of fused bits, the initial (i.e., intact or unblown) state of the fusible links determine the initial values that are stored by OTP memory 120 (and therefore lifecycle advance register 121, lifecycle rollback register 122, and personality register 123, in particular.) In another example, if OTP memory 120 comprises an area of secured flash memory (or some other nonvolatile memory configured to be programmed only once) the initial values stored by OTP memory 120 may be (and therefore lifecycle advance register 121, lifecycle rollback register 122, and personality register 123, in particular) programmed by a manufacturer (OEM, or ODM, etc.)

A lifecycle advance value is received from OTP memory (206). For example, lifecycle value generator 130 may receive lifecycle advance value 125 from OTP memory 120 (and lifecycle advance register 121, in particular.) A lifecycle rollback value is received from OTP memory (208). For example, lifecycle value generator 130 may receive lifecycle rollback value 126 from OTP memory 120 (and lifecycle advance rollback register 122, in particular.)

A lifecycle state value is generated from the lifecycle advance value and the lifecycle rollback value (210). For example, lifecycle value generator 130 may, using a lifecycle state generating process, calculate a lifecycle state value 135 based on lifecycle advance value 125 and lifecycle rollback value 126. An example lifecycle state generating process may comprise, or be, a bitwise exclusive-OR (XOR) of lifecycle advance value 125 and lifecycle rollback value 126 in order to produce lifecycle state value 135.

A personality value is received from OTP memory (212). For example, one-way function 140 may receive personality value 127 from OTP memory 120 (and personality register 123, in particular.) A key split value is generated based on the secret key value, the personality value, and the lifecycle state value (214). For example, one-way function 140 may generate key split value 145 using secret key value 175, lifecycle state value 135, and personality value 127 as inputs to a one-way scrambling function. An example scrambling function may include using the personality value 127 and/or the lifecycle state value 135 as key tree path(s) with the secret key value 175 as an AES key (or visa-versa).

Encryption keys are generated from the key split value (216). For example, key amalgamation 150 may generate keys 160 based on key split value 145 and a base key identification 151. Keys 160 may include, for example, an ECC key for signing, an ECC private key for encryption/decryption; an AES-256 device specific key, and/or an AES-128 device specific key.

Figure 3:
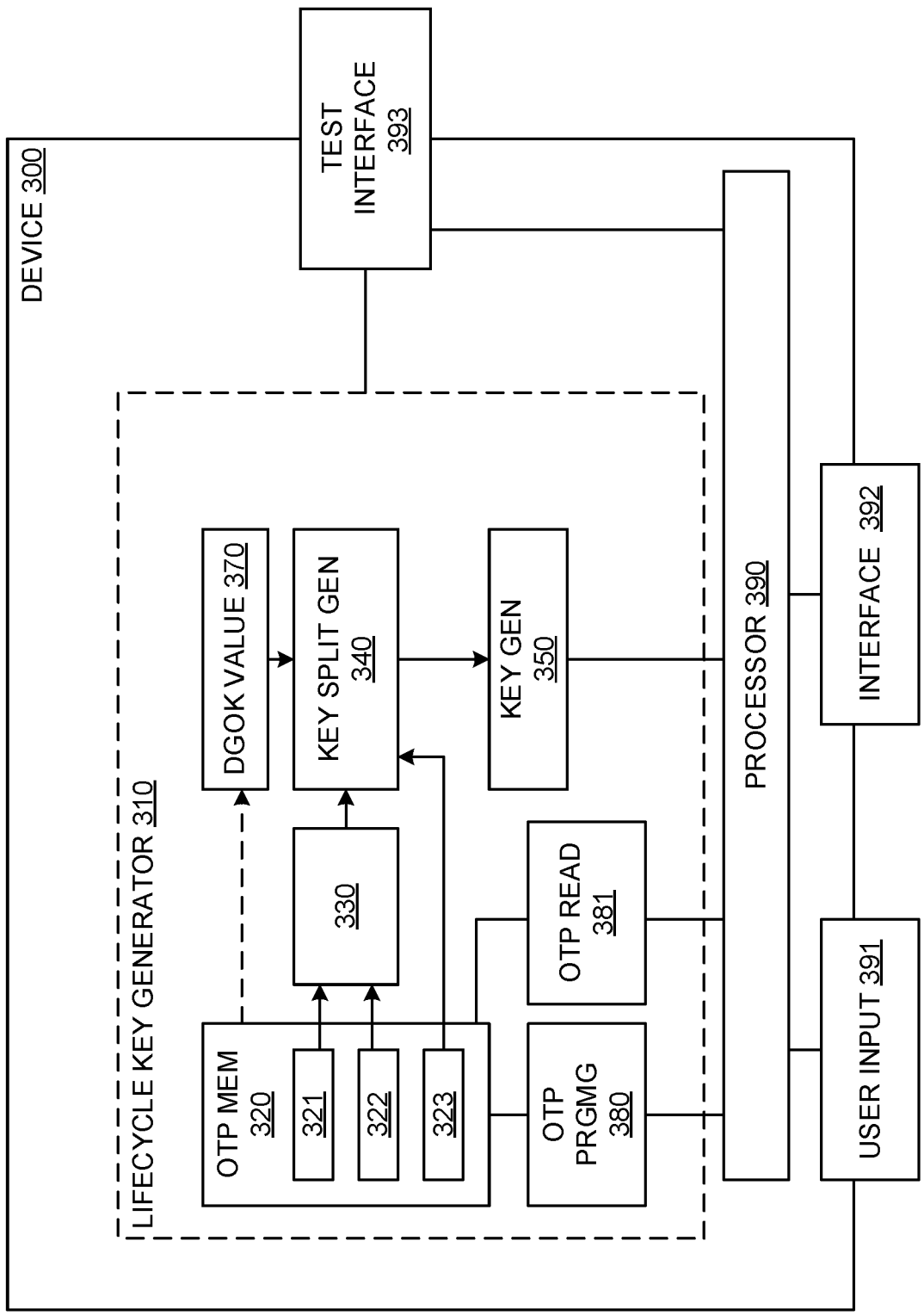
FIG. 3 is a block diagram illustrating a device that includes a cryptographic lifecycle management system.

FIG. 3 is a block diagram illustrating a device that includes a cryptographic lifecycle management system. In FIG. 3, device 300 comprises lifecycle key generator 310, processor 390, user input 391, interface 392, and test interface 393. Lifecycle key generator 310 includes one-time programmable memory 320, lifecycle value generator 330, device generated one-time programmable key split (DGOK) 370, key split generator 340, key generator 350, OTP programmer 380, and OTP read circuitry 381. It should be understood that one-time programmable memory 320 can be, for example, a one-time electrically programmable semiconductor memory (e.g., fabricated on a semiconductor substrate or using a semiconductor material).

DGOK 370 (a.k.a., secret key) is operatively coupled to key split generator 340. DGOK 370 stores a secret value in hardware. In an embodiment, DGOK may be stored in a secure (i.e., inaccessible to processor 390 and/or test interface 393) location of OTP memory 320. In another embodiment, DGOK 370 may be embedded in the design (i.e., netlist) or configuration of device 300 such that DGOK 370 is inaccessible (i.e., cannot be read, written, calculated, or otherwise or discerned) via processor 390 and/or test interface 393. DGOK 370 provides a secret value to key split generator 340. In an embodiment, DGOK 370 provides a 256-bit secret value to key split generator 340.

Lifecycle advance register 321 is operatively coupled to lifecycle value generator 330. OTP memory 320 provides lifecycle value generator 330 with lifecycle advance values stored by lifecycle advance register 321. Lifecycle rollback register 322 is operatively coupled to lifecycle value generator 330. OTP memory 320 provides lifecycle value generator 330 with lifecycle rollback values stored by lifecycle rollback register 322.

Lifecycle value generator 330 receives lifecycle advance values and lifecycle rollback values from OTP memory 320. Lifecycle value generator 330 processes lifecycle advance values and lifecycle rollback values using a lifecycle state generating process/function. This lifecycle state generating process produces lifecycle state values from the respective lifecycle advance values and lifecycle rollback values it receives. These lifecycle state values are provided to key split generator 340.

Personality register 323 is operatively coupled to key split generator 340. Personality register 323 stores personality values. OTP memory 320 provides key split generator 340 with the personality values stored by personality register 323. Using OTP programming 380 and OTP read circuitry 381, processor 390 under the control of software on device 300 can read and write the contents of one or more of lifecycle advance register 321, lifecycle rollback register 322, and personality register 323. Test interface 393 may also be used to read and write, or otherwise obtain and/or set the contents of, one or more of lifecycle advance register 321, lifecycle rollback register 322, and personality register 323.

Key split generator 340 uses DGOK 370, the lifecycle state values from lifecycle state generator 330, and personality values from personality register 323 to generate key split values. Key split generator 340 may produce key split values by a process that includes, for example, using a given personality value as a key tree path and DGOK 370 as an AES key. Likewise, the process key split generator 340 used to produce key split values may further include using lifecycle state values as a key tree path and the result of the previous processing as an AES key. Other one-way functions/processes may be used to generate key split values from DGOK 370, lifecycle state values, and personality values. Thus, it should be understood that any difference (even a one bit difference) between a given lifecycle state value, or a given personality value, will result in different key split values being produced and supplied to processor 390. In addition, if the one-way function process is selected appropriately, it should be economically infeasible to determine DGOK 370 from the key split values or the keys provided to processor 390. Likewise, is should also be economically infeasible to determine DGOK 370 from any data and/or circuitry that can be accessed or controlled by test interface 393.

The key split values output by key split generator 340 are provided to key generator 350. Based on key split values and base key identification values, key generator 350 produces encryption keys for use by the processor 390 in cryptographic operations. These cryptographic operations can include, for example, Elliptic Curve Cryptography (ECC) for signing (i.e., authenticating), ECC encryption and/or decryption, AES-256 encryption and/or decryption, and/or AES-128 encryption and/or decryption. Other cryptographic operations for other uses can also be produced from key split values by key generator 350.

Processor 390 is operatively coupled to lifecycle key generator 310. Processor 390 is operatively coupled to lifecycle key generator 310 to at least control the generation of keys by lifecycle key generator 310. Processor 390 is operatively coupled to key generator 350 of lifecycle key generator 310 to receive keys that have been generated by key generator 350. Processor 390 is operatively coupled to OTP memory 320 of lifecycle key generator 310 to read and write values stored by OTP memory 320. In particular, processor 390 is operatively coupled to OTP memory 320 in order to read and write lifecycle advance register 321, lifecycle rollback register 322, and personality register 323. Test interface 393 is operatively coupled to processor 390 and lifecycle key generator 310 to control and test circuitry. Test interface 393 may be, or include, for example, a test access port (TAP) for boundary scan and other serial test/access operations.

Device 300 may go through various lifecycles. By changing the values in lifecycle advance register 321 and personality register 323, the keys produced by lifecycle key generator 310, which are used by processor 390 and/or accessible via test interface 393, can be changed. By changing the keys used by processor 390, the data (and/or authentications and/or authorization) associated with device 300 are protected from unauthorized use/access. Likewise, by changing the keys accessible by test interface 393, the data (and/or authentications and/or authorization) associated with device 300 are protected from unauthorized use/access.

During operation, the bits of personality register 323 may be successively (and permanently) changed by processor 390 in response to commands received via user interface 391 and/or interface 392. These changes to personality register 323 may be in the manner of a thermometer coded counter. Since the changes to personality register 323 are permanent and irreversible, the keys produced by lifecycle key generator 310 are permanently changed when the value in personality register 323 is changed.

During operation, the bits of lifecycle advance register 321 may be successively (and permanently) changed by processor 390 in response to commands received via user interface 391 and/or interface 392. These changes to lifecycle advance register 321 may be in the manner of a thermometer coded counter. The changes to lifecycle advance register 321 are permanent and irreversible. However, the effect of the changes to lifecycle advance register 321 may be undone by corresponding changes to lifecycle rollback register 322. Thus, changes to lifecycle advance register 321 that cause lifecycle key generator 310 to produce temporary keys can be negated by appropriate changes to lifecycle rollback register 322. The changes to lifecycle rollback register 322 that undo the effects the changes to lifecycle advance register 321 are determined by lifecycle value generator 330. In other words, the lifecycle value generating process implemented by lifecycle value generator 330 is configured such that certain values in lifecycle rollback register 322 undo the effects of certain values in lifecycle advance register 321.

For example, if the lifecycle value generating process is a bitwise XOR operation between lifecycle rollback register 322 and lifecycle advance register 321, as long as lifecycle rollback register 322 and lifecycle advance register 321 are equal (e.g., both 0x0000h, both 0x00FFh, etc.) the same resulting lifecycle state value (e.g., 0x0000h) will be provided to key split generator 340—thereby resulting in lifecycle key generator 310 providing processor 390 with the same set of keys. If lifecycle rollback register 322 and lifecycle advance register 321 are not equal, different lifecycle state values will be provided to key split generator 340—thereby resulting in lifecycle key generator 310 providing processor 390 with respectively different sets of keys.

To illustrate, consider the above example where the lifecycle value generating process is a bitwise XOR operation between lifecycle rollback register 322 and lifecycle advance register 321. If lifecycle advance register 321 is 0x00FFh, and lifecycle rollback register 322 is 0x007Fh, lifecycle state generator will provide key split generator 340 with the value 0x0080h. Since 0x0080h is not equal to 0x0000h, and key split generator 340 implements a one-way function that depends upon all of the input values, including the lifecycle state value, the key split value produced by key split generator 340 (and therefore the keys produces by lifecycle key generator 310) will be different.

In another example, if lifecycle advance register 321 is thermometer code incremented from 0x00FFh to 0x01FFh, and lifecycle rollback register 322 is also thermometer code incremented from 0x007Fh, to 0x00FF, lifecycle state generator will provide key split generator 340 with the value 0x00100. Since 0x00100h (the current lifecycle state value) is not equal to 0x0080h (the previous lifecycle state value), the key split value produced by key split generator 340 (and therefore the keys produces by lifecycle key generator) will be different from the pre-increment values—even though both of these values represent a single increment of the lifecycle state.

Thus, it should be understood that lifecycle value generator 330 is configured such that certain (but not all) values stored in lifecycle rollback register 322 undo the effects of certain corresponding values stored in lifecycle advance register 321. In other embodiments, lifecycle value generator 330 may be configured such that arbitrary pairings of lifecycle advance values and lifecycle rollback values undo (or fail to undo) the effects of corresponding lifecycle advance values.

Figure 4A:
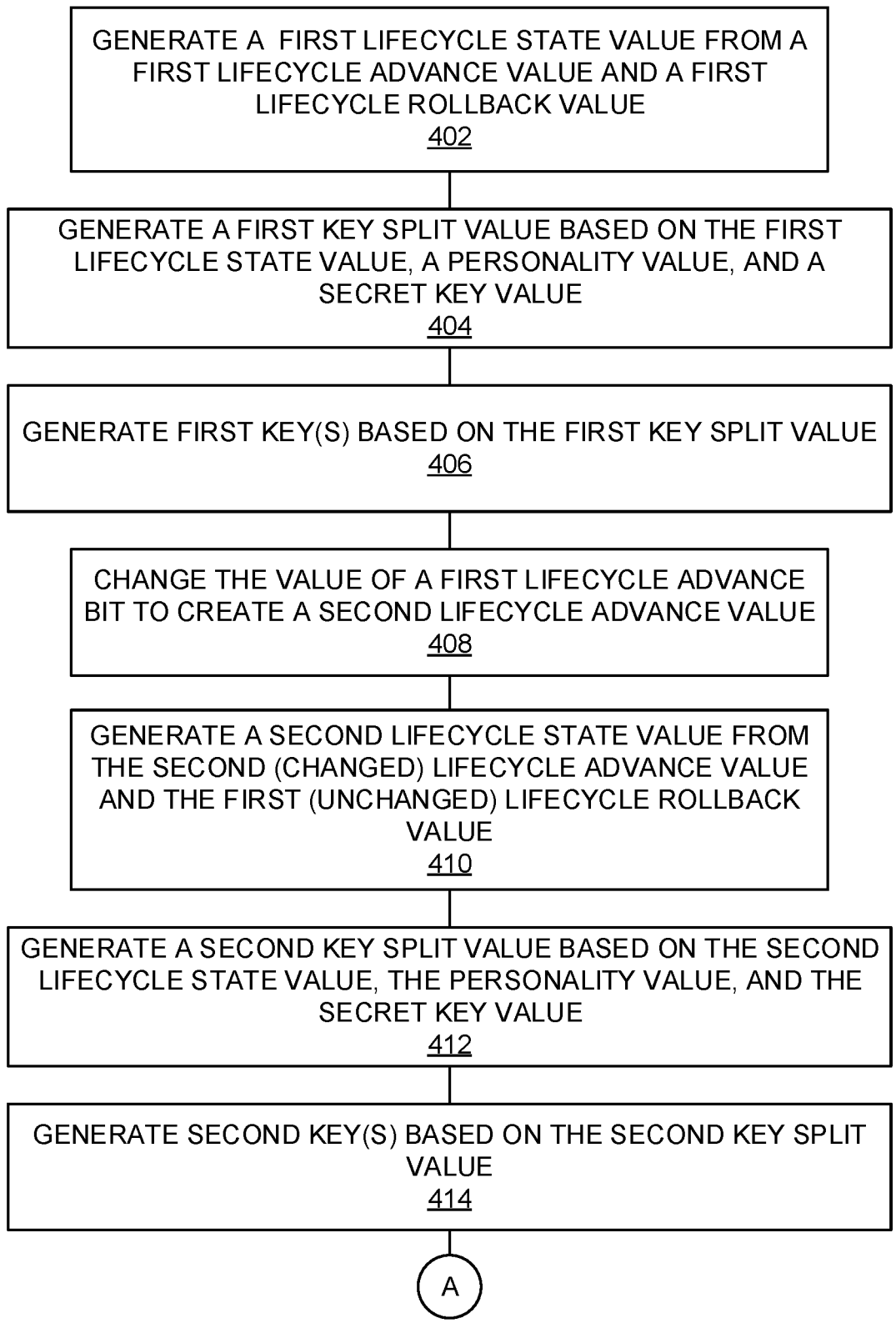
FIGS. 4A and 4B are a flowchart illustrating a method of configuring and de-configuring a cryptographically managed lifecycle state.
Figure 4B:
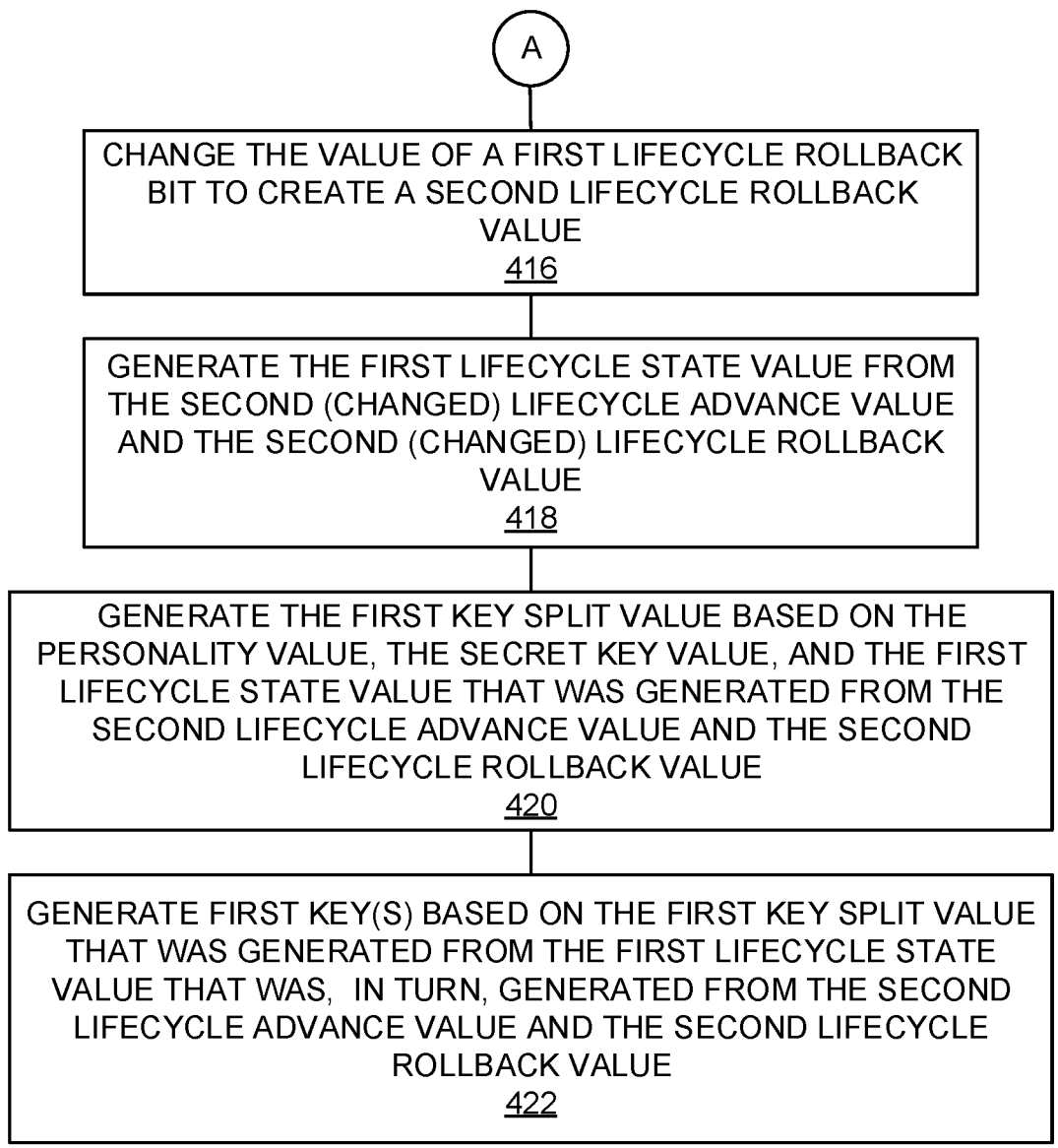

FIGS. 4A and 4B are a flowchart illustrating a method of configuring and de-configuring a cryptographically managed lifecycle state. The steps in FIGS. 4A and 4B may be performed by one or more elements of system 100 and/or device 300. A first lifecycle state value is generated from a first lifecycle advance value and a first lifecycle rollback value (402). For example, key state generator 330 may generate a first lifecycle state value from the contents of lifecycle advance register 321 and lifecycle rollback register 322. This first lifecycle state value is provided key split generator 340.

A first key split value is generated based on the first lifecycle state value, a personality value, and a secret key value (404). For example, key split generator 340 may generate a first key split value that is provided to key generator 350. This first key split value may be the result of a one-way function that takes the first lifecycle state value from lifecycle state generator 330, the contents of personality register 323, and DGOK 370 as inputs to produce a key split value. First key(s) are generated based on the first key split value (406). For example, key generator 350 may generate one or more keys based on the first key split value received from key split generator 340.

The value of a first lifecycle advance bit is changed to create a second lifecycle advance value (408). For example, processor 390 may control OTP programming 380 to change the value of a bit in lifecycle advance register 321. Processor 390 may control OTP programming 380 to change the value of a bit in lifecycle advance register 321 in response to user input 391, and/or commands received via interface 392 (e.g., commands received via a wireless interface.)

A second lifecycle state value is generated from a second lifecycle advance value and the first lifecycle rollback value (410). For example, key state generator 330 may generate a second lifecycle state value from the changed contents of lifecycle advance register 321 and the unchanged contents of lifecycle rollback register 322. This second lifecycle state value is provided to key split generator 340.

A second key split value is generated based on the second lifecycle state value, the personality value, and the secret key value (412). For example, key split generator 340 may generate a second key split value that is provided to key generator 350. This second key split value may be the result of the one-way function taking the second lifecycle state value from lifecycle state generator 330, the contents of personality register 323, and DGOK 370 as inputs to produce the second key split value. Second key(s) are generated based on the second key split value (414). For example, key generator 350 may generate one or more keys based on the second key split value received from key split generator 340.

The value of a first lifecycle rollback bit is changed to create a second lifecycle rollback value (416). For example, processor 390 may control OTP programming 380 to change the value of a bit in lifecycle rollback register 322. Processor 390 may control OTP programming 380 to change the value of a bit in lifecycle rollback register 322 in response to user input 391, and/or commands received via interface 392 (e.g., commands received via a wireless interface.)

The first lifecycle state value is generated from the second lifecycle advance value and the second lifecycle rollback value (418). For example, key state generator 330 may generate the first lifecycle state value from the changed contents of lifecycle advance register 321 and the changed contents of lifecycle rollback register 322. This first lifecycle state value is provided to key split generator 340.

The first key split value is generated based on the personality value, the secret key value, and the first lifecycle state value that was generated from the second lifecycle advance value, and the second lifecycle rollback value (420). For example, key split generator 340 may generate the first key split value as a result of the one-way function taking the first lifecycle state value from lifecycle state generator 330 (as produced by the changed contents of lifecycle advance register 321 and the changed contents of lifecycle rollback register 322), the contents of personality register 323, and DGOK 370. First key(s) are generated based on the first key split value that was generated from the first lifecycle state value that was, in turn, generated from the second lifecycle advance value and the second lifecycle rollback value (422). For example, key generator 350 may generate one or more keys based on the first key split value received from key split generator 340, where the first key split value was generated from the changed contents of the changed contents of lifecycle advance register 321 and the changed contents of lifecycle rollback register 322.

Figure 5A:
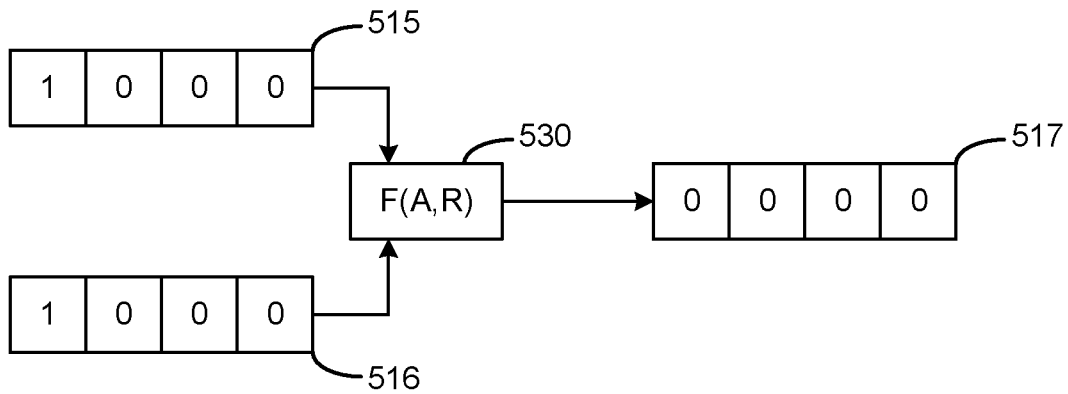
FIGS. 5A-5C illustrate an example lifecycle state generating process.
Figure 5B:
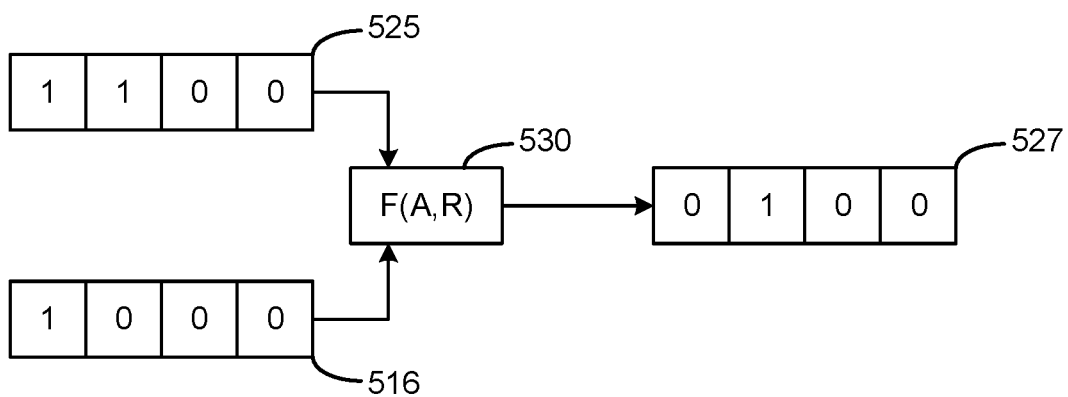
Figure 5C:
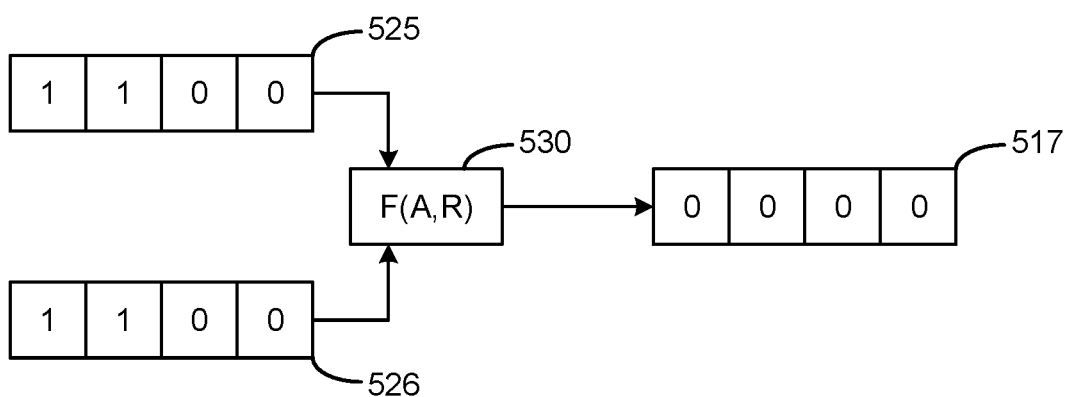

FIGS. 5A-5C illustrate an example lifecycle state generating process. The process illustrated in FIGS. 5A-5C may be performed by one or more elements of system 100 and/or device 300—for example, lifecycle state generator 330. FIG. 5A illustrates a first lifecycle advance value 515 as the binary bits 1000b. A first lifecycle rollback value 516 is also illustrated as the binary bits 1000b. The first lifecycle advance value 515 and the first lifecycle rollback value 516 are input to a lifecycle state generating function, F(A,R) 530, where A represents an input parameter corresponding to lifecycle advance value, and R represents an input parameter corresponding to a lifecycle rollback value. The output of lifecycle state generating function 530 is first lifecycle state value 517. In FIG. 5A, the output of lifecycle state generating function 530 in response to the first lifecycle advance value 515 and the first lifecycle rollback value 516 are the binary bits 0000b.

FIG. 5B illustrates a second lifecycle advance value 525 as the binary bits 1100b. The first lifecycle rollback value 516 is illustrated as the binary bits 1000b in FIG. 5B. The second lifecycle advance value 525 and the first lifecycle rollback value 516 are input to lifecycle state generating function 530. The output of lifecycle state generating function 530 is second lifecycle state value 527. In FIG. 5B, the output of lifecycle state generating function 530 in response to the second lifecycle advance value 525 and the first lifecycle rollback value 516 are the binary bits 0100b.

FIG. 5C illustrates a second lifecycle advance value 525 as the binary bits 1100b. A second lifecycle rollback value 526 is illustrated as the binary bits 1100b in FIG. 5C. The second lifecycle advance value 525 and the first lifecycle rollback value 526 are input to lifecycle state generating function 530. The output of lifecycle state generating function 530 is the first lifecycle state value 517. In FIG. 5C, the output of lifecycle state generating function 530 in response to the second lifecycle advance value 525 and the second lifecycle rollback value 526 are the binary bits 0000b. Thus, it should be understood that the lifecycle state generating function 530 illustrated in FIGS. 5A-5C is a bitwise XOR operation (i.e., F(A,R)=A⊕BB.) It should also be understood that other lifecycle state generating function 530 may comprise other functions including an arbitrary mapping of lifecycle advance values and corresponding lifecycle rollback values that produce the same output lifecycle state values for a plurality of mappings.

Figure 6:
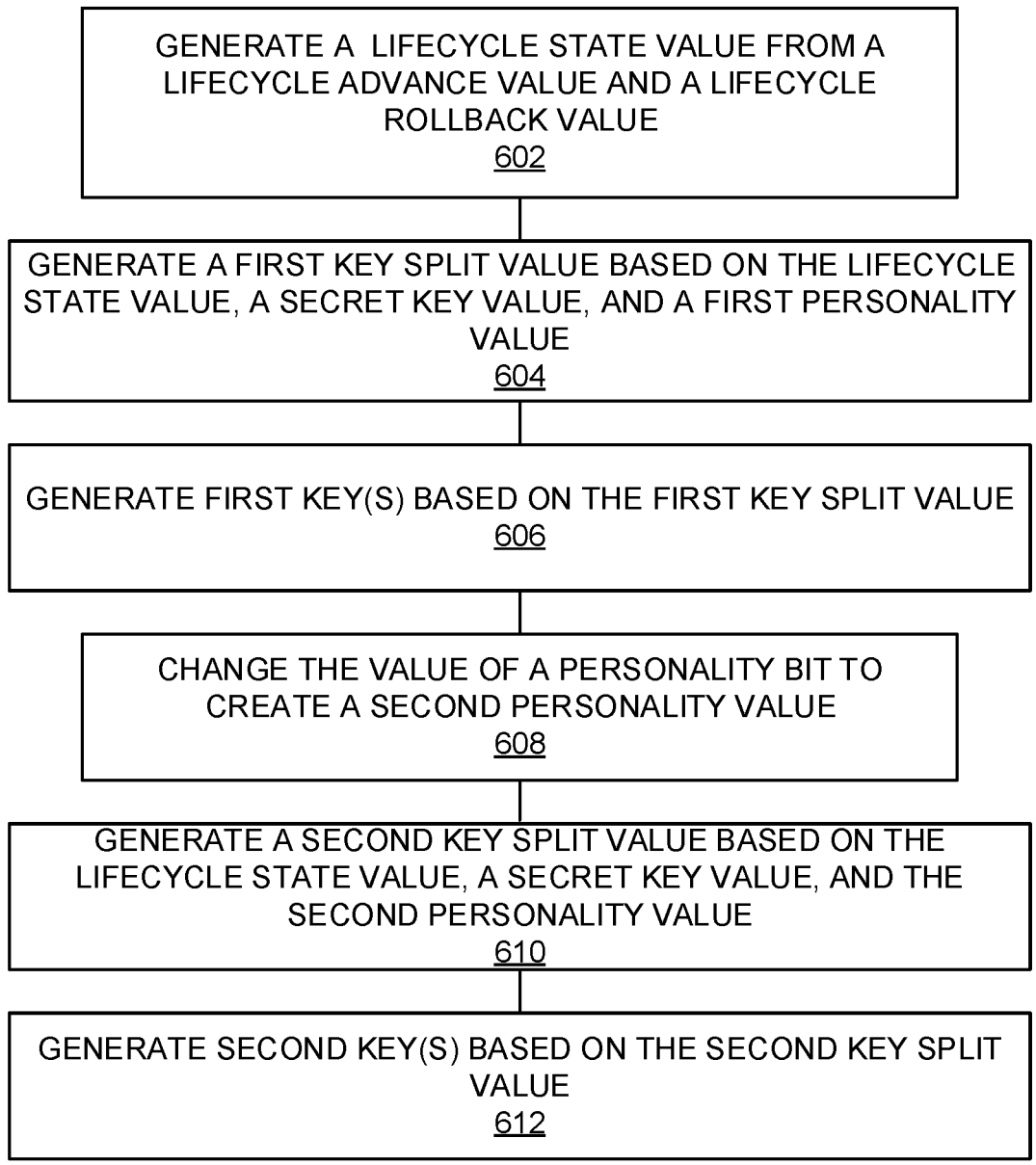
FIG. 6 is a flowchart illustrating a method of generating lifecycle dependent encryption keys.

FIG. 6 is a flowchart illustrating a method of generating lifecycle dependent encryption keys. The steps illustrated in FIG. 6 may be performed by one or more elements of system 100 and/or device 300. A lifecycle state value is generated from a lifecycle advance value and a lifecycle rollback value (602). For example, lifecycle state generator 330 may calculate a lifecycle state value from the contents of lifecycle advance register 321 and the contents of lifecycle rollback register 322.

A first key split value is generated that is based on the lifecycle state value, a secret key value, and a first personality value (604). For example, key split generator 340 may, based on the lifecycle state value, the contents of personality register 323, and DGOK value 370, calculate a first key split value. This first key split value may be provided to key generator 350.

First key(s) are generated based on the first key split value (606). For example, key generator 350 may generate a first key based on the first key split value received from key split generator 340. This first key may be provided to processor 390 for use in cryptographic operations.

The value of a personality bit is changed to create a second personality value (608). For example, processor 390 may control OTP programming 380 to change the value of at least one bit in personality register 323. Processor 390 may control OTP programming 380 to change the value of a bit in personality register 323 in response to user input 391, and/or commands received via interface 392 (e.g., commands received via a wireless interface.)

A second key split value is generated that is based on the lifecycle state value, a secret key value, and the second personality value (610). For example, key split generator 340 may, based on the lifecycle state value, the changed contents of personality register 323, and DGOK value 370, calculate a second key split value. This second key split value may be provided to key generator 350.

Second key(s) are generated based on the second key split value (612). For example, key generator 350 may generate a second key based on the second key split value received from key split generator 340. This second key may be provided to processor 390 for use in cryptographic operations. It should be understood that since changes to personality register 323 are permanent and irreversible, the keys produced by lifecycle key generator 310 after the bit is changed in personality register 323 are permanently changed.

Figure 7:
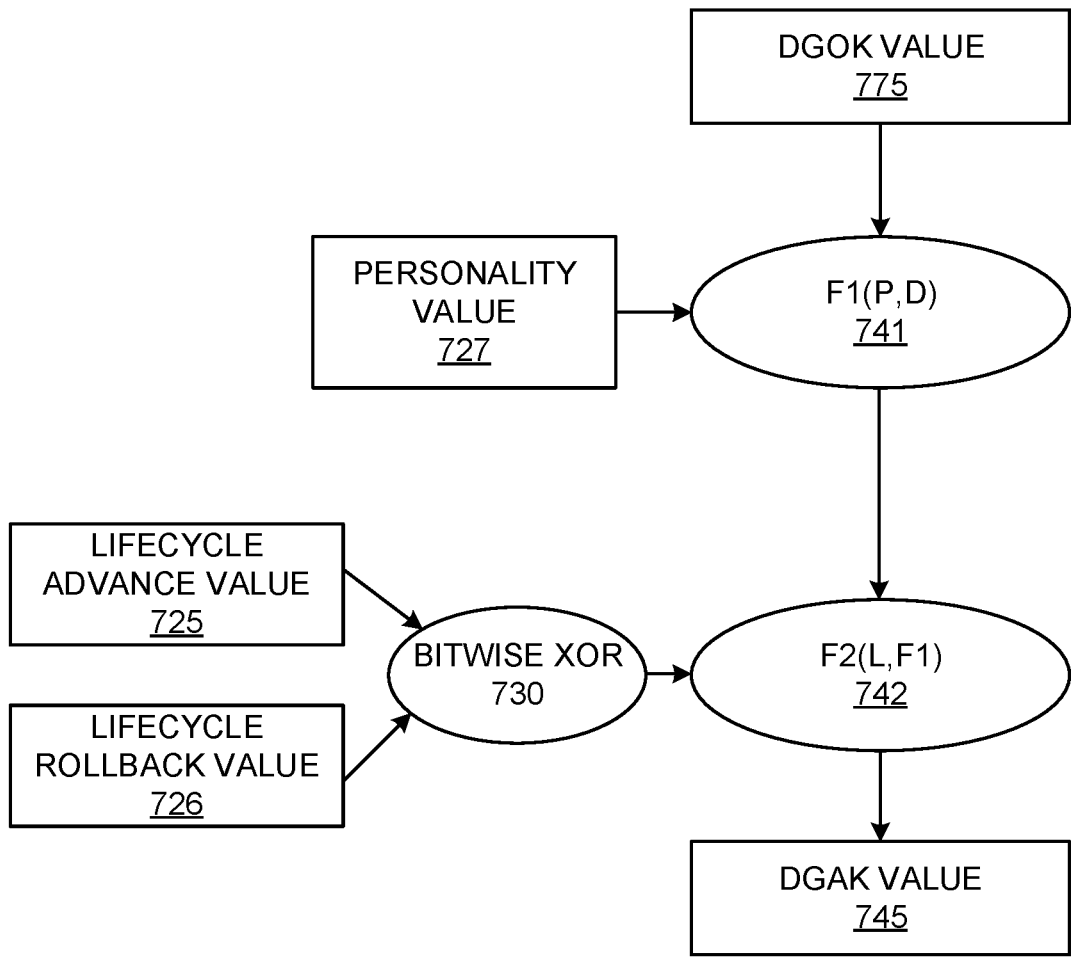
FIG. 7 is a diagram illustrating the generation of accessible key split values.

FIG. 7 is a diagram illustrating the generation of accessible key split values. The functions illustrated in FIG. 7 may be implemented by one or more elements of system 100 and/or system 300—and key split generator 340, in particular. In FIG. 7, a DGOK value 775 and a personality value 727 are input to a first scrambling (e.g., one-way) function 741, F1(P,D)—where P represents the personality value and D represents the DGOK (secret key) value. For example, DGOK value 370 and personality register 323 may provide inputs to key split generator 340. Key split generator 340 may implement a first scrambling function using DGOK value 370 and the contents of personality register 323. This first scrambling function may comprise, for example, using the contents of personality register 323 as a key tree path and the DGOK value as an AES key.

A lifecycle advance value 725 and a lifecycle rollback value 726 are input to a bitwise exclusive-OR (XOR) function 730 to produce a lifecycle state value. The lifecycle state value and the output from the first scrambling function are input to a second scrambling function 742, F2(L,F1), where L represents the lifecycle state value and F1 represents the output of the first scrambling function. The output of the second scrambling function is a device generated accessible key split (DGAK)—for example key split 145.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, device 300, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 8:
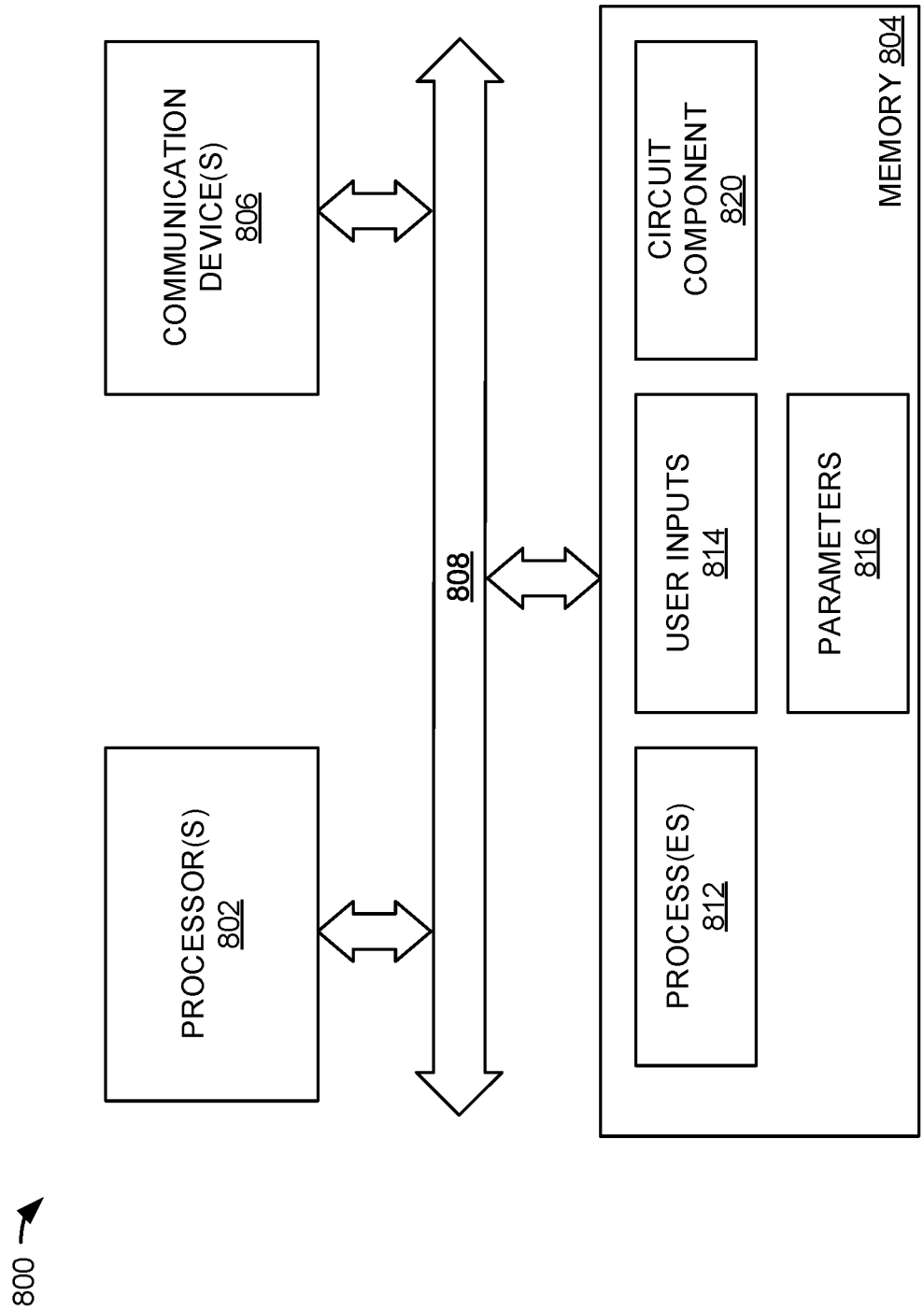
FIG. 8 is a block diagram of a processing system.

FIG. 8 is a block diagram illustrating one embodiment of a processing system 800 for including, processing, or generating, a representation of a circuit component 820. Processing system 800 includes one or more processors 802, a memory 804, and one or more communications devices 806. Processors 802, memory 804, and communications devices 806 communicate using any suitable type, number, and/or configuration of wired and/or wireless connections 808.

Processors 802 execute instructions of one or more processes 812 stored in a memory 804 to process and/or generate circuit component 820 responsive to user inputs 814 and parameters 816. Processes 812 may be any suitable electronic design automation (EDA) tool or portion thereof used to design, simulate, analyze, and/or verify electronic circuitry and/or generate photomasks for electronic circuitry. Representation 820 includes data that describes all or portions of system 100, device 300, and their components, as shown in the Figures.

Representation 820 may include one or more of behavioral, register transfer, logic component, transistor, and layout geometry-level descriptions. Moreover, representation 820 may be stored on storage media or communicated by carrier waves.

Data formats in which representation 820 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email User inputs 814 may comprise input parameters from a keyboard, mouse, voice recognition interface, microphone and speakers, graphical display, touch screen, or other type of user interface device. This user interface may be distributed among multiple interface devices. Parameters 816 may include specifications and/or characteristics that are input to help define representation 820. For example, parameters 816 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 804 includes any suitable type, number, and/or configuration of non-transitory computer-readable storage media that stores processes 812, user inputs 814, parameters 816, and circuit component 820.

Communications devices 806 include any suitable type, number, and/or configuration of wired and/or wireless devices that transmit information from processing system 800 to another processing or storage system (not shown) and/or receive information from another processing or storage system (not shown). For example, communications devices 806 may transmit circuit component 820 to another system. Communications devices 806 may receive processes 812, user inputs 814, parameters 816, and/or circuit component 820 and cause processes 812, user inputs 814, parameters 816, and/or circuit component 820 to be stored in memory 804.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of generating encryption keys, comprising:
configuring a semiconductor device having circuitry with a secret key value, the secret key value not accessible to software running on the semiconductor device;
configuring one-time electrically programmable semiconductor memory bits with initial values, each one-time electrically programmable semiconductor memory bit being limited to one change in value from a respective initial value;
receiving a first lifecycle advance value from lifecycle advance bits stored by a first subset of the one-time electrically programmable semiconductor memory bits;
receiving a first lifecycle rollback value from lifecycle rollback bits stored by a second subset of the one-time electrically programmable semiconductor memory bits;
generating, using a lifecycle state generating process, a first lifecycle state value from the first lifecycle advance value and the first lifecycle rollback value;
receiving a first personality value from personality bits stored by a third subset of the one-time electrically programmable semiconductor memory bits;
using a one-way processing function, generating a first key split value based on the secret key value, the first personality value, and the first lifecycle state value; and
generating, from the first key split value, a first encryption key, wherein changing a lifecycle advance bit value stored by the first subset of the one-time electrically programmable semiconductor memory bits without changing a lifecycle rollback bit value stored by the second subset of the one-time programmable semiconductor memory bits will generate a second encryption key that is not equal to the first encryption key.

2. The method of claim 1, further comprising:
changing at least a first lifecycle advance bit thereby changing the first lifecycle advance value stored by the first subset of the one-time electrically programmable semiconductor memory bits to a second lifecycle advance value;
generating, using the lifecycle state generating process, a second lifecycle state value from the second lifecycle advance value and the first lifecycle rollback value;
using the one-way processing function, generating a second key split value based on the secret key value, the first personality value, and the second lifecycle state value, the second lifecycle state value being different from the first lifecycle state value; and
generating, from the second key split value, the second encryption key for use in securing data processed by the semiconductor device, the second encryption key being different from the first encryption key as a result of the second lifecycle state value being different from the first lifecycle state value.

3. The method of claim 2, further comprising:
changing at least a first lifecycle rollback bit thereby changing the first lifecycle rollback value stored by the second subset of the one-time electrically programmable semiconductor memory bits to a second lifecycle rollback value;
generating, using the lifecycle state generating process, the first lifecycle state value from the second lifecycle advance value and the second lifecycle rollback value;
using the one-way processing function, generating the first key split value based on the secret key value, the first personality value, and the first lifecycle state value as generated from the second lifecycle advance value and the second lifecycle rollback value; and
generating, from the first key split value that was generated from the first lifecycle state value that was further generated from the second lifecycle advance value and the second lifecycle rollback value, the first encryption key.

4. The method of claim 1, wherein the first lifecycle state value is generated by the lifecycle state generating process when a lifecycle advance value stored by the first subset of the one-time electrically programmable semiconductor memory bits equals a lifecycle rollback value stored by the second subset of the one-time electrically programmable semiconductor memory bits.

5. The method of claim 1, wherein the lifecycle state generating process maps a first plurality of pairs of lifecycle advance values and lifecycle rollback values to the first lifecycle state value.

6. The method of claim 5, wherein a second plurality of pairs of lifecycle advance values and lifecycle rollback values that are not mapped by the lifecycle state generating process to the first lifecycle state value are mapped by the lifecycle state generating process to values other than the first lifecycle state value.

7. The method of claim 1, further comprising:
changing at least a first personality bit thereby changing the first personality value stored by the third subset of the one-time electrically programmable semiconductor memory bits to a second personality value;
using the one-way processing function, generating a personalized key split value based on the secret key value, the second personality value, and the first lifecycle state value; and
generating, from the personalized key split value, a personalized encryption key for use in securing data processed by the semiconductor device, the personalized encryption key being different from the first encryption key as a result of the second personality value being different from the first personality value.

8. A method of operating an integrated circuit, comprising:
programming at least one of a plurality of one-time programmable memory bits where each one-time programmable memory bit is limited to one change in value from a respective initial value, the plurality of one-time programmable memory bits including lifecycle advance bits stored by a first subset of the plurality of one-time programmable memory bits, lifecycle rollback bits stored by a second subset of the plurality of the one-time programmable memory bits, and personality bits stored by a third subset of the plurality of one-time programmable memory bits;
using a lifecycle value generating process, generating lifecycle values from lifecycle advance values stored by the lifecycle advance bits and lifecycle rollback values stored by the lifecycle rollback bits;
using a one-way processing function, generating key split values based on personality bit values, lifecycle values, and a secret key value; and
generating, based on the key split values, a plurality of encryption key values wherein changing a lifecycle advance bit value stored by the first subset of the one-time programmable memory bits without changing a lifecycle rollback bit value stored by the second subset of the one-time programmable memory bits changes the plurality of encryption key values generated by key amalgamation circuitry.

9. The method of claim 8, wherein the plurality of encryption key values are generated by key amalgamation circuitry.

10. The method of claim 8, wherein changing a lifecycle advance bit value stored by the first subset of the one-time programmable memory bits and changing a corresponding lifecycle rollback bit value stored by the second subset of the one-time programmable memory bits does not change the plurality of encryption key values generated.

11. The method of claim 8, wherein a first set of lifecycle advance bit values and a corresponding first set of lifecycle rollback bit values result in a first set of encryption key values being generated.

12. The method of claim 11, wherein a second set of lifecycle advance bit values and a corresponding second set of lifecycle rollback bit values result in a second set of encryption key values being generated that are not in the first set of encryption key values.

13. The method of claim 8, wherein changing any personality bit value stored by the third subset of the one-time programmable memory bits changes the plurality of encryption key values generated.

14. The method of claim 13, wherein a value of respective lifecycle rollback bits negate the effect of corresponding lifecycle advance bits on the encryption key values generated.

15. A method of operating an integrated circuit, comprising:
providing a secret key value where the secret key value is not accessible to software controlling the integrated circuit;
programming at least one of a plurality of one-time programmable memory bits where each one-time programmable memory bit is limited to one change in value from a respective initial value, the plurality of one-time programmable memory bits including lifecycle advance bits stored by a first subset of the plurality of one-time programmable memory bits, lifecycle rollback bits stored by a second subset of the plurality of the one-time programmable memory bits, and personality bits stored by a third subset of the plurality of one-time programmable memory bits;
using a lifecycle value generating process, generating lifecycle values from lifecycle advance values stored by the lifecycle advance bits and lifecycle rollback values stored by the lifecycle rollback bits, the lifecycle values to include a first lifecycle state value generated from a first lifecycle advance value and a first lifecycle rollback value;
using a one-way processing function, generating key split values based on personality bit values, lifecycle values, and the secret key value, the key split values to include a first key split value based on the secret key value, a first personality value, and the first lifecycle state value; and
generating, based on the key split values, a first plurality of encryption key values, the first plurality of encryption key values to include a first encryption key generated from the first key split value, wherein changing a lifecycle advance bit value stored by the first subset of the one-time electrically programmable memory bits without changing a lifecycle rollback bit value stored by the second subset of the one-time programmable memory bits will generate a second plurality of encryption key values that does not include the first encryption key value.

16. The method of claim 15, further comprising:
changing at least a first lifecycle advance bit to change the first lifecycle advance value stored by the first subset of the one-time programmable memory bits to a second lifecycle advance value,
generating a second lifecycle state value from the second lifecycle advance value and the first lifecycle rollback value by the lifecycle value;
generating a second key split value based on the secret key value, the first personality value, and the second lifecycle state value where the second lifecycle state value is different from the first lifecycle state value; and
generating, from the second key split value, a second encryption key, where the second encryption key is to be different from the first encryption key as a result of the second lifecycle state value being different from the first lifecycle state value.

17. The method of claim 16, wherein changing at least a first lifecycle rollback bit thereby changes the first lifecycle rollback value stored by the second subset of the one-time programmable memory bits to a second lifecycle rollback value, and the first lifecycle state value is generated from the second lifecycle advance value and the second lifecycle rollback value.

18. The method of claim 17, wherein the one-way processing function generates the first key split value based on the secret key value, the first personality value, and the first lifecycle state value as generated from the second lifecycle advance value and the second lifecycle rollback value, and the first encryption key is generated from the first key split value that was generated from the first lifecycle state value that was further generated from the second lifecycle advance value and the second lifecycle rollback value.

19. The method of claim 15, wherein changing any personality bit value stored by the third subset of the one-time programmable memory bits changes the plurality of encryption key values generated.

20. The method of claim 19, wherein the lifecycle value generating process maps a first plurality of pairs of lifecycle advance values and lifecycle rollback values to the first lifecycle state value.

* * * * *